United States Patent [19]

Yoshida

[11] 4,449,240

[45] May 15, 1984

[54] PATTERN RECOGNITION SYSTEM

[75] Inventor: Hajime Yoshida, Tokyo, Japan

[73] Assignee: Hajime Industries Ltd., Japan

[21] Appl. No.: 292,267

[22] Filed: Aug. 12, 1981

Related U.S. Application Data

[63] Continuation-in-part of Ser. No. 94,112, Nov. 14, 1979, abandoned.

[30] Foreign Application Priority Data

Nov. 17, 1978 [JP] Japan ................................ 53-141761

[51] Int. Cl.³ ............................................. G06K 9/62
[52] U.S. Cl. ........................................ 382/15; 382/50
[58] Field of Search .............................. 382/14, 15, 50

[56] References Cited

U.S. PATENT DOCUMENTS

| | | | |
|---|---|---|---|
| 3,333,248 | 7/1967 | Greenberg et al. | 382/15 |
| 3,457,552 | 7/1969 | Asendorf | 382/14 |
| 3,548,202 | 12/1970 | Ide et al. | 382/15 |
| 3,601,811 | 8/1971 | Yoshino | 382/15 |
| 3,623,015 | 11/1971 | Schmitz et al. | 382/15 |

Primary Examiner—Leo H. Boudreau

[57] ABSTRACT

A pattern recognition method is disclosed which makes a judgment that when the difference between an object to be inspected and a previously memorized reference object falls within a predetermined value, the object belongs to the same class as the reference object. During the inspection process, the predetermined value is changed in accordance with the results of past judgment.

4 Claims, 7 Drawing Figures

PATTERN RECOGNITION SYSTEM

This is a continuation-in-part application of Ser. No. 94,112, filed Nov. 14, 1979, now abandoned.

BACKGROUND OF THE INVENTION

1. Field of the Invention

The present invention relates generally to pattern recognition systems, and more particularly to pattern recognition systems with improved accuracy.

2. Description of the Prior Art

Pattern recognition systems of the prior art generally perform pattern recognition as shown in FIG. 1. An object 1 to be inspected is illuminated by light from a light source 3 powered by a stabilized power source 2. An electrooptical sensor 4, such as a television camera, senses an image of the object 1 and produces an electrical signal corresponding to the object 1 which is sent to a pattern recognition system 5.

Even though power for light source 3 is supplied by a stabilized power source 2, the light output of the light source 3 is not truly steady or constant over an extended period due to aging of the light source 3 and other causes. In addition, the ambient light level in the vicinity of the object 1 may change with time. Further, the video signal from camera 4 may exhibit changes due to drift, ambient temperature, component aging, etc. Such changes with time inevitably affect the judgment of the pattern recognition system 5. For example, even when the object 1 belongs to the same class as a standard object (in other words, when the difference between the two is smaller than a later explained predetermined value A), the difference G between the standard object and the object 1 being inspected may change with time in a manner shown by a curve a in the graph of FIG. 2. Further, when the object 1 being inspected does not belong to the same class as the standard object (in other words, when the difference between the two is larger than the predetermined value A), the difference G between the standard object and the object 1 being inspected also changes in a manner shown in a curve b in the graph of FIG. 2 as time passes. However, the predetermined value A which is used as a standard to judge whether or not the object 1 belongs to the same class as the standard object remains unchanged throughout the inspection process. Accordingly, in systems under the prior art, during period T1 of FIG. 2, while the object 1 actually belongs to the same class as the standard object, it is judged by the system 5 as not belonging to the same class. Further, during a time period of T2, even though the object 1 does not belong to the same class as the standard object, it is judged by the system 5 as belonging to the same class as the standard object and such misjudgment represents a fault of the system.

OBJECTS AND SUMMARY OF THE INVENTION

Accordingly, it is an object of the present invention to provide a novel pattern recognition method free of the defects in the prior art method.

It is another object of the invention to provide a pattern recognition method in which the reliability of judgments of an object by a pattern recognition system is not reduced over time in spite of changes and surrounding temperature and other changes which influence the output video signal from a camera.

According to an aspect of the present invention, a pattern recognition method is provided wherein judgment is made that an object to be inspected belongs to the same class as an already memorized standard object when the difference between said inspected object and said already memorized object is within a predetermined value, comprising the step of changing said predetermined value during object inspection processing in accordance with the results of past judgments.

Additional, and other objects, features and advantages of the present invention will become apparent from the following description taken in conjunction with the accompanying drawings.

DETAILED DESCRIPTION OF THE PREFERRED EMBODIMENTS

Figure 3:
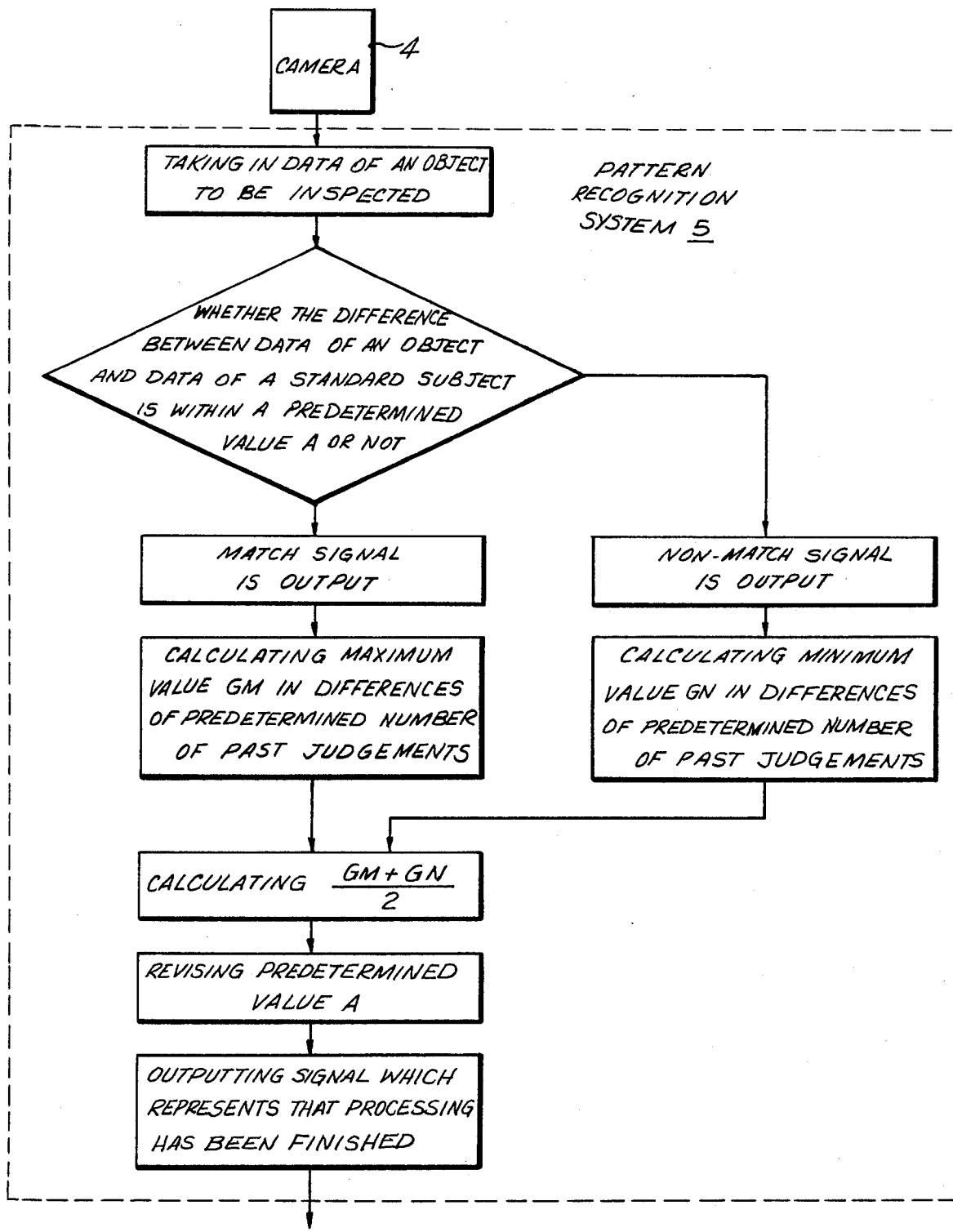
FIGS. 3 and 5 are respectively flow charts used to explain examples of the present invention.

Referring now to FIG. 3, a flow chart describes the sequence of operations of a first embodiment of the invention. After the camera 4 produces data representing the object, the pattern recognition system 5 takes in the data representing an object to be inspected and determines whether the difference between the object being inspected and the data representing a standard subject is within a predetermined value A. If the data is within a predetermined value A, a match signal is produced and a value GM is calculated representing the differences between inspected object and standard subject over a predetermined number of past judgments. This is employed in calculating a mean value of differences $(GM+GN)/2$. The value GN is calculated when non-match signals are produced. That is, when the difference between the new data and the standard subject exceeds the value A. In this case, the minimum value of such non-match differences GN is calculated. As a result of the mean value $(GM+GN)/2$, the predetermined value A is revised and an output signal is produced indicating that the processing of the new object is completed.

Figure 4:
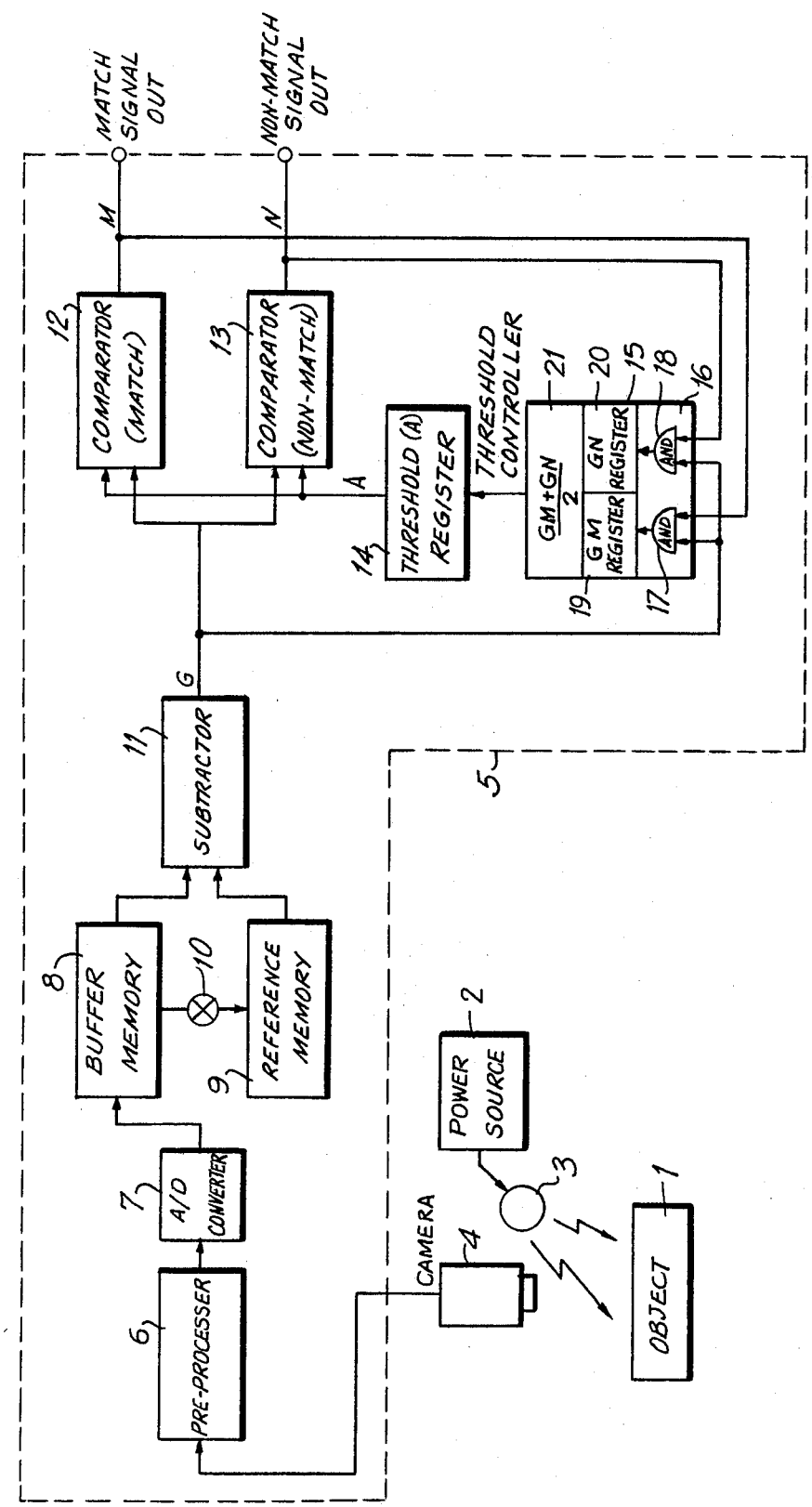
FIG. 4 is a detailed block diagram of an embodiment of the invention corresponding to the flow chart of FIG. 3.

Referring now to FIG. 4, pattern recognition system 5 is seen to contain a preprocessor 6 receiving the image signal from camera 4. The output of preprocessor 6 is digitized in an A/D converter 7 and the resulting digital signal is tentatively stored in a buffer memory 8. A reference memory is provided to which data from the buffer memory 8 may be transferred by a switch 10 when initially providing the pattern recognition system 5 with its standard class of object to be recognized. During normal operation, the data in buffer memory 8 is subtracted from the data in reference memory 9 in a subtractor 11 to produce a data difference G.

Data difference G is applied to inputs of a match comparator 12 and a non-match comparator 13.

A threshold register 14 contains an updated value of a threshold A which is applied to inputs of match comparator 12 and non-match comparator 13. Threshold value A is applied to opposite inputs of these two comparators so that, one or the other will produce an output in response to each value of data difference G applied thereto. If data difference G is less than threshold A, match comparator 12 produces an output. Conversely, if data difference G exceeds threshold A, non-match comparator 13 provides an output.

A threshold controller 15 continues to update the value of threshold A in threshold register 14 as a result of past comparisons. An input section 16 includes AND gates 17 and 18. AND gate 14 receives the match signal from match comparator 12 at one of its inputs and the difference signal at a second input. AND gate 18 receives the non-match signal from non-match comparator 13 at one of its inputs and the difference signal G at its other input. A GM register 19 stores one or more, but preferably a plurality of values of difference signal G. A GN register 20 stores one or more and preferably a plurality of values of data difference G. A threshold update calculator 21 produces a mean value of GM and GN which is applied to threshold register 14 for updating the threshold value A therein.

Figure 5:
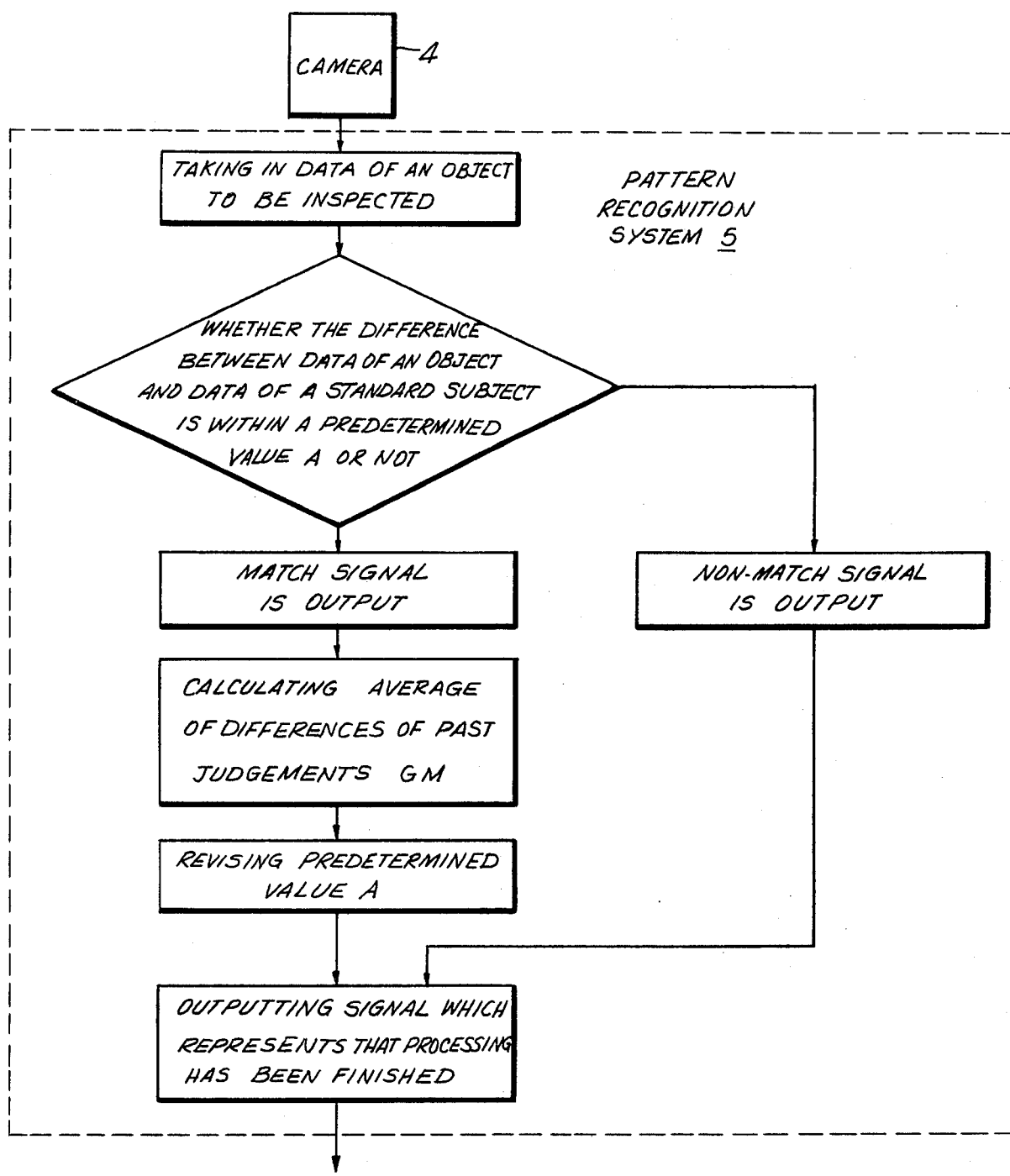

Referring now to FIG. 5, there is shown a flow diagram of a second embodiment of the invention which, instead of employing both the match and non-match values of data difference signal G (GM and GN), employs only the match value of data difference signal G to revise threshold A. This is further shown in the block diagram of FIG. 6 wherein only the match output of comparator 12 is applied to an AND gate 22 in an input section 23 of a threshold controller 24.

The values of data difference G enables to pass through AND gate 22 by the match signal n are stored in GM register 25. Preferably of a plurality of match data difference signals GM are stored in GM register 25 and the average value of the stored signals is calculated in an average value calculator 26. The calculated average value is employed to adjust threshold A in threshold register 14.

Figure 1:
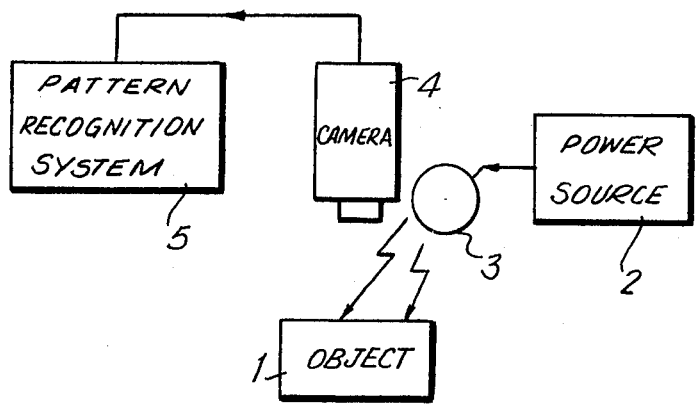
FIG. 1 is a block diagram showing an example of a pattern recognition system of the prior art.
Figure 2:
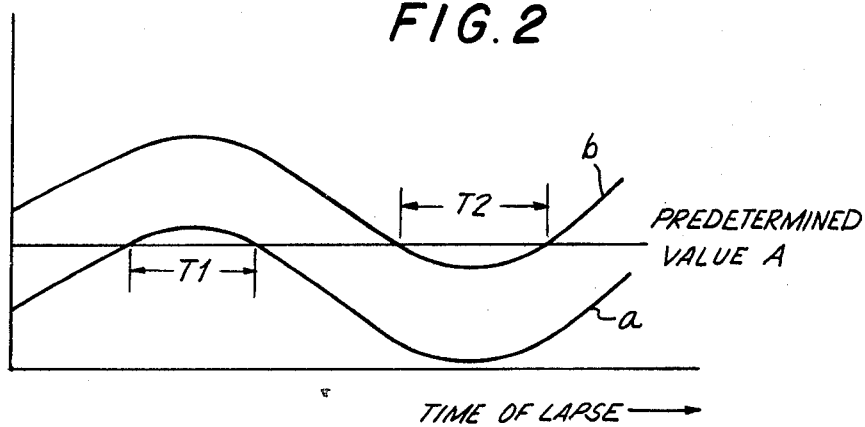
FIG. 2 is a graph used to explain the operation of the apparatus of FIG. 1.

By continuously adjusting the threshold value A in threshold register 14 according to the results of past comparisons, the incorrect judgments of the type described in connection with FIG. 2 are avoided.

Figure 7:
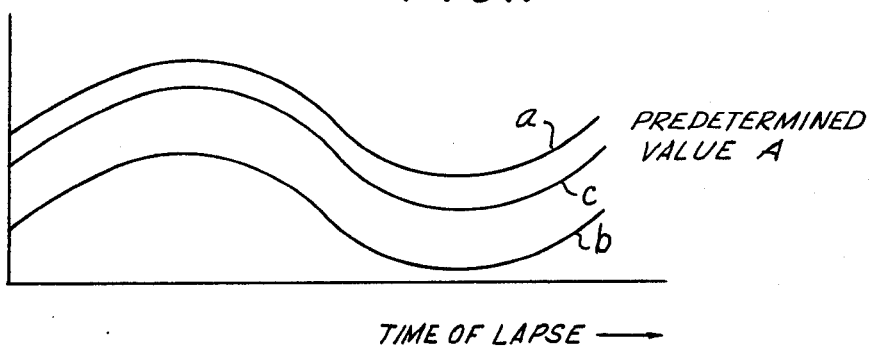
FIG. 7 is a graph used to explain the effectiveness of the present invention.

Referring to FIG. 7, the line a represents the data from the same object wherein the data varies with time due to the causes previously mentioned. Object a is outside the class of objects to be recognized. Line b is the time varying data from an object within the class to be recognized. Line c represents the threshold value A which is made to vary with time according to the results of measurements of line b (in the embodiments of FIGS. 5 and 6) or of lines a and b (in the embodiments of FIGS. 3 and 4). Since threshold value A is varied up and down by the same ambient variables which affect the measurement data, false judgments due to variations in ambient variables is thereby avoided.

Figure 6:
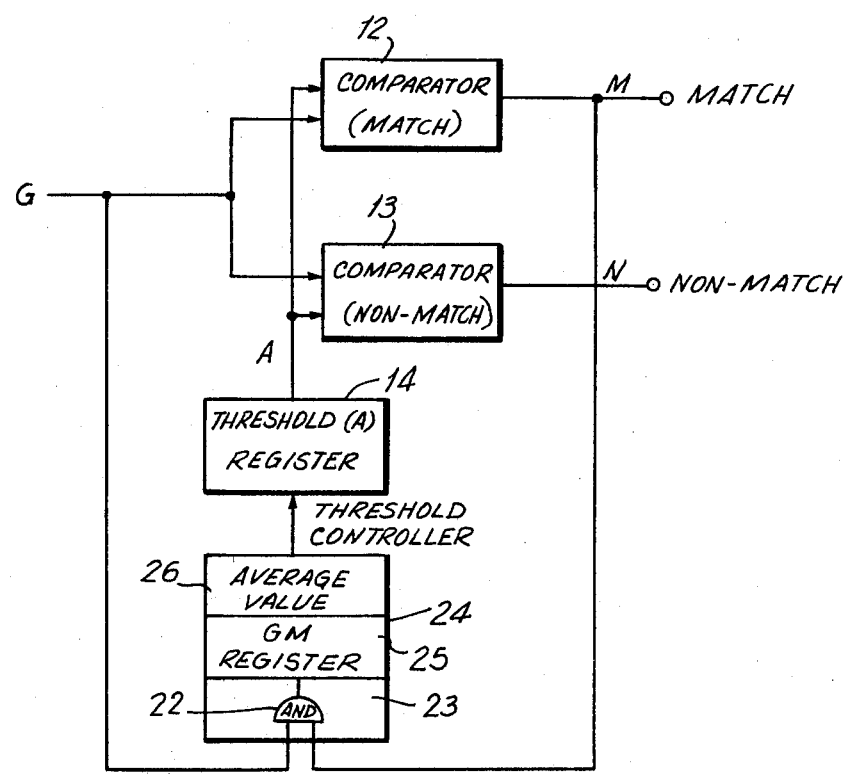
FIG. 6 is a detailed block diagram of a portion of a pattern recognition system corresponding to the flow chart of FIG. 5.

The apparatus shown in FIGS. 4 and 6 can be any convenient apparatus constructed of discrete components or large scale integration. In the preferred embodiments, some or all of the digital operations can be performed with a microprocessor of any convenient standard type.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of pattern recognition comprising:
producing an electrical signal related to a standard object of a type exhibiting a pattern to be recognized;
storing characteristics of said electrical signal in a pattern recognition system to produce a stored standard signal;
setting a predetermined value A for determining whether or not an electrical signal contains characteristics sufficiently close to said stored standard signal to be judged to be the same as said standard object;
producing a second electrical signal related to an object being inspected;
determining a difference between said second electrical signal and said stored standard signal;
outputting a match electrical signal indicating that said second electrical signal represents an object exhibiting said pattern if said difference differs from said predetermined value A by less than a threshold value;
outputting a non-match electrical signal indicating that said second electrical signal does not represent an object exhibiting said pattern if said difference differs from said predetermined value A by more than said threshold value;
increasing and decreasing a value of said predetermined value A with time in accordance with said difference; and
continuing the above steps of producing, determining and outputting for each object being inspected whereby said threshold A is varied according to changing external conditions.

2. A method according to claim 1, further comprising the steps of averaging said differences over a predetermined number to produce an average difference and wherein the step of increasing and decreasing includes increasing and decreasing a value of said predetermined value A in accordance with said average difference.

3. A method according to claim 1, further comprising the steps of storing a largest value of said difference when said match electrical signal is produced, storing the smallest value of said difference when said non-match electrical signal is produced and the step of increasing and decreasing includes increasing and decreasing a value of said predetermined value A in accordance with the size of both said largest value and said smallest value.

4. A method according to claim 3, wherein said step of increasing and decreasing includes producing a mean of said largest and smallest values and substituting said mean for said predetermined value A.

* * * * *